Oct. 13, 1936.  W. H. KROGER  2,057,383
OIL BURNER CONTROL
Filed April 19, 1934

INVENTOR
William H. Kroger
BY
[signature]
ATTORNEY

Patented Oct. 13, 1936

2,057,383

UNITED STATES PATENT OFFICE 2,057,383

OIL BURNER CONTROL

William H. Kroger, Purdy's, N. Y.

Application April 19, 1934, Serial No. 721,366

7 Claims. (Cl. 236—21)

The device, the subject of this invention is intended as a means for controlling valves, motors or other devices, but in the construction which I have shown, I will describe it as arranged for the control of an oil burning boiler.

The particular objects of the invention are to provide means for cutting off or stopping the oil flow should the light of the boiler become extinguished and also stopping the operation of the motor should the oil flow be discontinued.

The device in its entirety is a heat sensitive element adapted to conduct a useful current when the element is heated but to act as a non-conductor when the element becomes cold.

Associated with this element I have arranged other controlling devices operating with it or operating as a consequence of the heat sensitive device, and while in the specification which is to follow, I will describe my device as operating with the mechanisms shown associated therewith, it will of course be understood that other mechanisms may be employed.

The following is what I consider the best means of carrying out my invention and the accompanying drawing should be referred to for a complete understanding of the specification which follows.

In the drawing.

Similar reference numerals indicate like parts in all of the figures where they appear.

Figure 1:
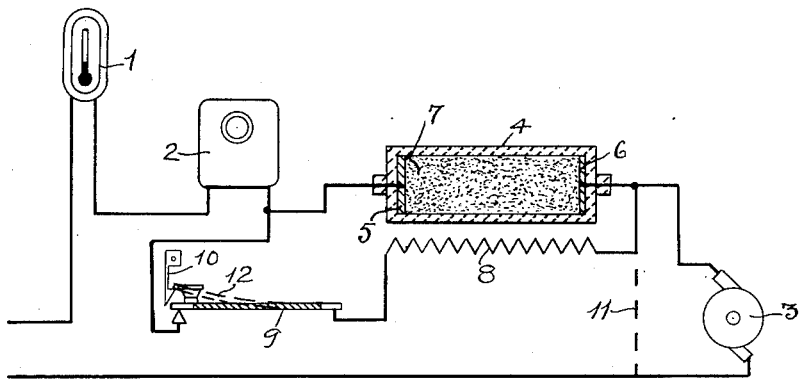
Fig. 1 shows a simple arrangement for an oil burner control.

At 1 I show a thermostat and at 2 a device that is commonly termed a boiler control. This device consists of a mechanism which controls the burner of a boiler when the thermostat causes a sufficient current to pass through the boiler control. Both of these devices are standard and require no particular modification for use with my controlling mechanism.

At 3 I show a motor which operates the fuel pump or blower or atomizer depending of course upon the particular oil burning system with which the device is employed. At 4 I show my controlling mechanism.

This controlling mechanism 4 is usually formed as a cylinder or strip of rare earths or material of which there are several, which will not conduct a current when cold, but which when heated will pass a considerable amount of electric current. These materials are referred to as dry electrolites and may be magnesium or kaolin and are of the general nature of the materials used in the Nernst glower or any of the other materials having the desired qualities and of course it is possible to employ strips or pencils of these materials without enclosing them in a casing, but because of the danger of such dry electrolites to become mechanically injured, I prefer that they be enclosed generally as suggested.

As previously stated it is necessary that the electrolite be heated to cause it to conduct and therefore I arrange a heater 8 in close proximity to the member 4. This heater is an electrical heater introduced into a circuit which may be considered a by-pass circuit and in this circuit I also introduce a thermostatic switch 9 with a lock-out mechanism 10.

In the operation of this device, the current passes through the thermostat through the boiler control, through the thermostatic switch 9, through the heater 8 and either through the motor 3 or if desired through a by-pass circuit indicated by the dotted line 11. The heater then will heat the member 4 and when this member 4 becomes sufficiently hot it will offer an easy path for the current from the thermostat 1 through the boiler control 2 through the member 4 to the motor and back to the other side of the line and at this time the heater 8 will be shunted by the member 4.

I have so proportioned the member 9 that it will over heat and be warped out of the circuit if the oil flame does not start in a pre-determined number of cycles of operation of my device and thereupon the lock-out member 10 will engage the switch 9 retaining it on an open circuit until the lock-out is manually operated.

The member 4 and the heater 8 are of course arranged in a place where they are subjected to the heat of the oil flame as they must be retained hot and therefore the members 4 and 8 may be placed in the fire box of the boiler or in the walls of the boiler fire box. Now if the boiler fire goes out the current will cease to flow, the motor will cease to operate and any valves not shown that may be controlled by my device will also be closed. If the flame cannot be started my device will lock-out as previously stated, whereupon it will be necessary to release the switch 9 to allow it to close the circuit through the heater 8 before the device can again be put in operation, thus introducing a very definite safety factor and a factor that overcomes much of the annoyance, waste and danger which results from oil overflows in oil operations.

Figure 2:
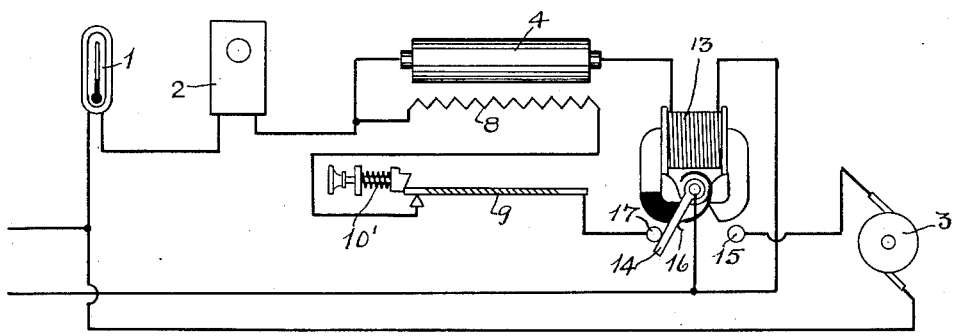
Fig. 2 shows a somewhat more complicated arrangement. Both of these figures are for the most part diagrammatic.

In Figure 2 I show the introduction of a relay and such a device will be employed wherever it is found that the current required by the motor or valves or other mechanisms is too large for my device. In this figure the thermostat is indicated at 1 and the boiler control at 2. The member 4 as shown may be a cartridge as previously suggested, the heater 8 being arranged adjacent thereto. The switch 9 is similar to the switch 9, shown in Figure 1 except that the lock-out and release mechanism 10' is of a different construction, it being more rugged than is the device shown in Figure 1.

At 13 I show a relay introduced into the circuit from the member 4 and when the blade 14 of the relay is in the position shown, current will pass through the switch 9 and through the heater 8, but when sufficient current can pass through the member 4, the arm 14 is caused to contact with the button 15 and the circuit through the motor 3 will be completed. Upon the failure of the circuit through the member 4 because of the cooling of this member, a spring 16 will return the arm 14 into contact with the button 17, so that current may again pass through the switch 9 and the heater 8, but this device is also arranged to operate similar to the device shown in Figure 1 in that the switch 8 will open and remain open if the flame is not established or cannot be established after a pre-determined period. Of course it will be understood that any type of relay may be employed and that my device may be used in a very different arrangement of component parts and other modifications may be made within the scope of the appended claims without departing from the principle or sacrificing the advantages of this invention.

Having carefully and fully described my invention, what I claim and desire to secure by patent is.

1. An electrical circuit which includes the electrical operated devices of a control member consisting of a material which will conduct a current, but only when heated and a plurality of means for heating said member one of which is electrical and means for by-passing or cutting out of circuit the current from said electrical heating means when the heated member has reached a temperature sufficient to cause it to carry the desired current.

2. The combination of controlling mechanisms and a controlled mechanism of a conductor adapted to conduct current only when hot and electric heater means for heating said conductor and a heat operated switch for cutting out said heater should the controlled devices fail to operate.

3. In a device for controlling oil fire furnaces comprising a motor, a thermostat and a boiler control and a current conductor adapted to conduct current to the motor only when heated and an electric heater for said current conductor, said current conductor and said heater being so arranged as to be constantly under the influence of the boiler fire; an automatically operated switch for passing current through said heater to heat said current conductor, said switch being adapted to start the motor and thereupon or thereafter discontinue the current through the heater.

4. An electric conductor consisting of a strip of material which is an insulator at ordinary temperatures and becomes a relatively good conductor at relatively higher temperatures, combined on its extremities with fixed terminals for conducting current through the same and with a heat producing structure separate from the said conductor and operating to raise all parts of the strip between the terminals to a conducting temperature, the characteristics of said conductor being such that it will not be maintained at a conducting temperature by the current passing there-thru and will be maintained at conducting temperature by the separate heat producing structure.

5. The combination with an oil fire furnace having an electrically operated feeding mechanism, a relay for opening the electric circuit to said feeding mechanism when the heat of the fire box drops below a predetermined point, and means for controlling the operation of said relay said means being a conductor only when heated and whose cross section and specific resistance is made of such value that it will pass the proper amount of current necessary to actuate said relay only above a predetermined temperature, said current passed by said controlling means being insufficient to maintain the predetermined operating temperature of the temperature sensitive conductor by $I^2R$ loss in this conductor.

6. An oil or gas burner having a control circuit, means in said circuit operating as a control and an ignitor, said means having a negative temperature coefficient and a plurality of means for heating said control means and means for making one of said heating means inoperative when said control has reached a predetermined temperature.

7. A control circuit as herein set forth and including a control member having a negative temperature coefficient and adapted to serve as a control member and an ignitor and a plurality of means for heating said control member one of said heating means being shunted out of circuit upon the operation of the other heating means.

WILLIAM H. KROGER.